(No Model.)
J. P. SINCLAIR & F. A. FINLAY.
SPOOL.
No. 463,203.          Patented Nov. 17, 1891.
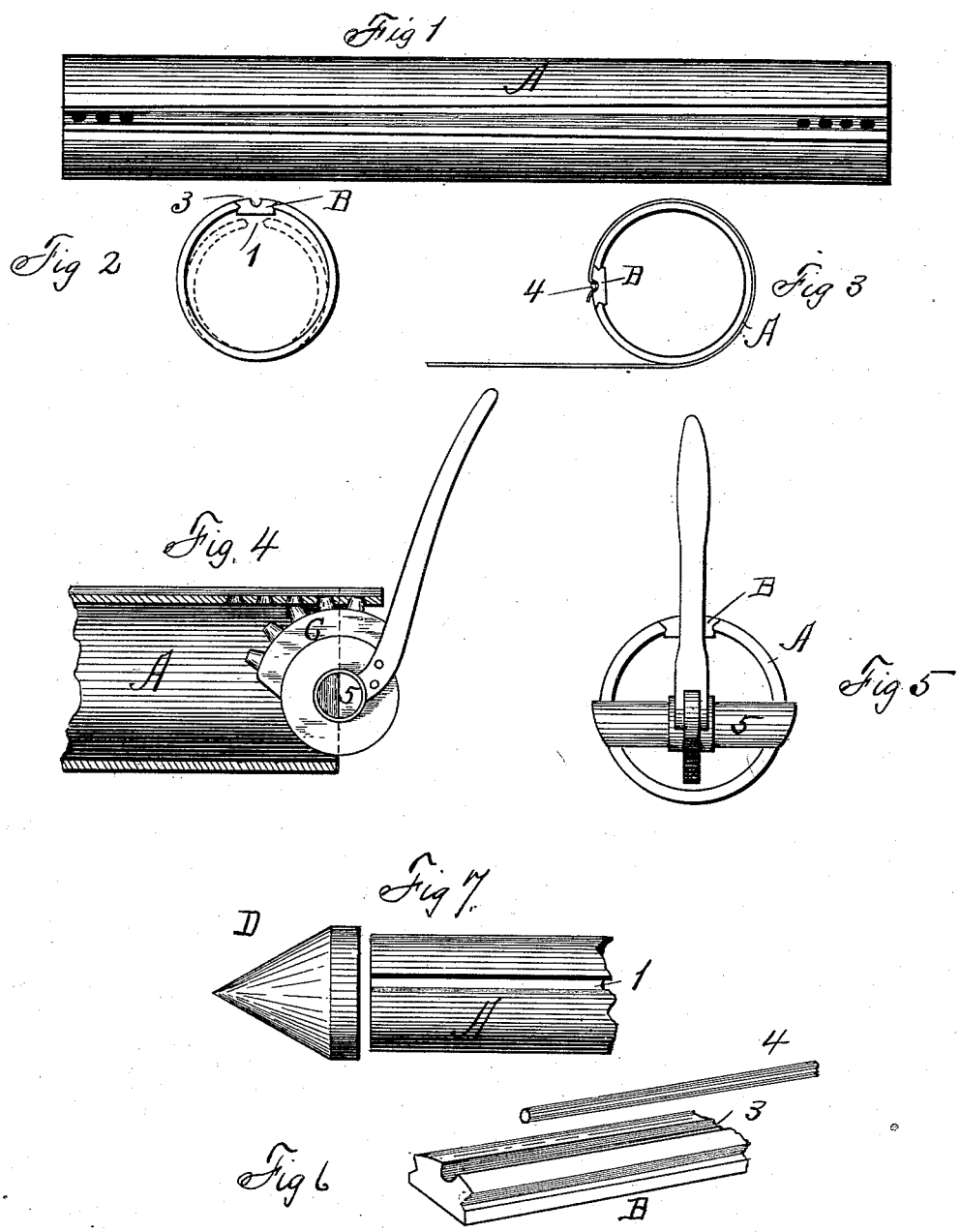

UNITED STATES PATENT OFFICE.

JAMES P. SINCLAIR AND FRANK. A. FINLAY, OF MOTTVILLE, NEW YORK.

SPOOL.

SPECIFICATION forming part of Letters Patent No. 463,203, dated November 17, 1891.

Application filed November 10, 1890. Serial No. 370,850. (No model.)

*To all whom it may concern:*

Be it known that we, JAMES P. SINCLAIR and FRANK. A. FINLAY, of Mottville, in the county of Onondaga, in the State of New York, have invented new and useful Improvements in Spools, of which the following, taken in connection with the accompanying drawings, is a full, clear, and exact description.

Our invention relates to spools.

Our object is to produce an adjustable spool capable of being expanded or contracted, as desired, and adapted to be used in winding paper or other material onto rolls, and so arranged as to be again inserted when it is desired to unroll the paper for use.

Our invention consists in the several novel features of construction and operation hereinafter described, and which are specifically set forth in the claims hereto annexed. It is constructed as follows, reference being had to the accompanying drawings, in which—

Figure 1 is a view of the spool complete, detached. Fig. 2 is an end view thereof, showing the position of the spool in dotted lines when contracted after the wedge or filler has been removed. Fig. 3 is an end view of the spool, showing a rod securing one end of the paper to the face of the spool for the purpose of winding. Fig. 4 is a view of a lever and ratchet engaging with the perforations in a wedge, showing one means for withdrawing said wedge. Fig. 5 is an end view thereof. Fig. 6 is a view of the dovetailed wedge and rod. Fig. 7 is a view of one end of the spool contracted and fitting into a cap to be used when reinserting the spool into the roll.

A is a collapsible cylinder or the body of the spool, constructed preferably of metal; but it will be evident that any elastic material may be used with the same results; and it is provided on one side with a longitudinal opening or slotway 1, the edges of which spool are rabbeted or dovetailed, as shown in the drawings. The slotway 1 may be made rectangular; but I preferably make it wedge or keystone shaped to better facilitate its withdrawal.

B is the wedge or filler with its lateral edges rabbeted or dovetailed so as to engage with the rabbets or dovetails in the lateral edges of the opening 1 in the spool. The said wedge is also provided upon its upper edge with a groove 3, into which we insert the rod 4 after one end of the paper has been placed therein, thus holding the same evenly and uniformly to the face of the spool until it has been wound sufficiently to hold itself.

C is a ratchet mounted upon a journal 5, showing one method of withdrawing the said wedge or filler, the teeth of which ratchet engage with the perforations in the said wedge, as shown.

D is a cap into which one end of the spool is compressed and inserted when we desire to reinsert the spool into the roll.

What we claim as our invention, and desire to secure by Letters Patent, is—

1. A spool consisting of a cylinder having a longitudinal opening, a filler adapted to be inserted therein and provided with a groove upon its upper face, and a rod adapted to be inserted therein for the purpose of holding one end of the paper, as set forth.

2. A spool consisting of a cylinder slitted longitudinally, the edges of the slit being beveled, and a filler grooved longitudinally in both edges to receive the edges of the slit and to create shoulders within and bearing against the inside of the cylinder adjacent to the edges of the slit.

3. The combination of a spool consisting of a cylinder having a longitudinal opening, the edges of which are beveled, and a wedging-filler having its edges grooved and adapted to engage with the aforesaid beveled edges, and a cap D, as set forth.

In witness whereof we have hereunto set our hands on this 6th day of November, 1890.

JAMES P. SINCLAIR.
FRANK. A. FINLAY.

In presence of—
H. P. DENISON,
E. V. MACK.